United States Patent [19]

Zmuidzinas

[11] 4,107,627
[45] Aug. 15, 1978

[54] STABILIZATION OF $HE_2(A^3\Sigma_u^+)$ MOLECULES IN LIQUID HELIUM BY OPTICAL PUMPING FOR VACUUM UV LASER

[76] Inventors: James C. Fletcher, Administrator of the National Aeronautics and Space Administration, with respect to an invention of Jonas S. Zmuidzinas, Glendale, Calif.

[21] Appl. No.: 782,463

[22] Filed: Mar. 29, 1977

[51] Int. Cl.² .............................................. H01S 3/09
[52] U.S. Cl. .................. 331/94.5 PE; 331/94.5 L; 331/94.5 P
[58] Field of Search ............... 331/94.5 P, 94.5 PE, 331/94.5 G, 94.5 D, 94.5 L; 307/88.3

[56] References Cited

U.S. PATENT DOCUMENTS

| | | | |
|---|---|---|---|
| 3,350,632 | 10/1967 | Robinson | 331/94.5 P |
| 3,958,189 | 5/1976 | Sprangle | 331/94.5 PE |
| 3,972,008 | 7/1976 | Fletcher et al. | 331/94.5 C |

OTHER PUBLICATIONS

Koehler et al., *Applied Physics Letters*, vol. 21, No. 5, Sep. 1, 1972, pp. 198-200.

*Primary Examiner*—William L. Sikes
*Assistant Examiner*—Marcus S. Rasco
*Attorney, Agent, or Firm*—Monte F. Mott; John R. Manning; Paul F. McCaul

[57] ABSTRACT

A technique is disclosed for achieving large populations of metastable spin-aligned $He_2(a^3\Sigma_u^+)$ molecules in superfluid helium to obtain lasing in the vacuum ultraviolet wavelength regime around 0.0800μm by electronically exciting liquid (superfluid) helium with a comparatively low-current electron beam (100–200keV, $\lesssim 10\mu A$) and spin aligning the metastable molecules by means of optical pumping with a modestly-powered (100mW) circularly-polarized CW laser operating at, for example, 0.9096 or 0.4650μm. Once a high concentration of spin-aligned $He_2(a^3\Sigma_u^+)$ is achieved with lifetimes of a few milliseconds, a strong microwave signal destroys the spin alignment and induces a quick collisional transition of $He_2(a^3\Sigma_u^+)$ molecules to the $A^1\Sigma_u^+$ state and thereby a lasing transition to the $X^1\Sigma g^+$ state.

14 Claims, 2 Drawing Figures

STABILIZATION OF HE$_2$(A$^3\Sigma_u^+$) MOLECULES IN LIQUID HELIUM BY OPTICAL PUMPING FOR VACUUM UV LASER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a method and apparatus for stabilization of He$_2$(a$^3\Sigma_u^+$) molecules in liquid (superfluid) helium for vacuum ultraviolet lasing.

The shorter wavelengths, increased resolution, and higher power densities of coherent radiation in the ultraviolet (UV) and vacuum UV regimes, as contrasted with optical wavelengths, are of great importance in applications, e.g., in physics and chemistry experiments (especially for molecular reaction studies), for power transmission in space, and in biomedical experiments and practice.

A vacuum UV laser using electronically-pumped superfluid helium has been proposed in U.S. Pat. No. 3,972,008 in which spatial periodicity in the liquid helium is induced by subjecting the fluid to acoustical or other energy, to establish standing waves. These standing waves produce resonant zones in the fluid, and the result is lasing in the wavelength regime around 0.0800μm. One variation which has been proposed in the aforesaid patent applies a laser beam through a semi-transparent mirror to induce periodicity in the fluid by photon energy instead of acoustic energy. The standing waves that demark the periodicity are thus produced by laser energy which in some multiple of the laser radiation that is to be generated by the system. In the present invention, optical pumping is not supplied for the purpose of inducing periodicity in the fluid, but rather to effect spin alignment of the He$_2$(a$^3\Sigma_u^+$) molecules for the purpose of increasing their population concentration and lifetime by inhibiting their deexcitation in bimolecular collisions.

SUMMARY OF THE INVENTION

In accordance with the present invention, a method for spin stabilizing excited He$_2$(a$^3\Sigma_u^+$)=He$_2$* molecules in superfluid helium is comprised of the steps of obtaining a high concentration of the metastable He$_2$* molecules using high-energy (>100keV) electron beam, and spin aligning the electronically-excited molecules by means of optical pumping with a CW circularly-polarized laser operating at suitable selected wavelengths, such as 0.9096μm or the more accessible wavelength of about 0.4650μm. Thus, by spin aligning or polarizing the He$_2$* population, the destruction of He$_2$* by bimolecular collisions is effectively suppressed to build up a large concentration of He$_2$* molecules. This high concentration of optically-pumped metastables is used for vacuum UV lasing by quickly destroying the spin alignment of the He$_2$* molecules to induce collisional destruction of the He$_2$* molecules with a microwave signal in favor of those in the A$^1\Sigma_u^+$ state. The population at that lower level and the feeding rate into that lower level are higher than those achievable by an electron beam excitation alone.

The novel features that are considered characteristic of this invention are set forth with particularity in the appended claims. The invention will best be understood from the following description when read in connection with the accompanying drawings.

DESCRIPTION OF PREFERRED EMBODIMENTS

It has been established that there is a possibility of achieving large populations of metastable, spin-aligned He$_2$(a$^3\Sigma_u^+$) molecules in electron-bombarded liquid (superfluid) helium by optical pumping using a circularly-polarized CW laser of properly selected wavelength, as will be discussed more fully hereinafter. Rate equations developed indicate that high He$_2$(a$^3\Sigma_u^+$) steady-state concentrations and favorable decay characteristics can be achieved by use of reasonable values of electron beam current and laser power.

Figure 1:
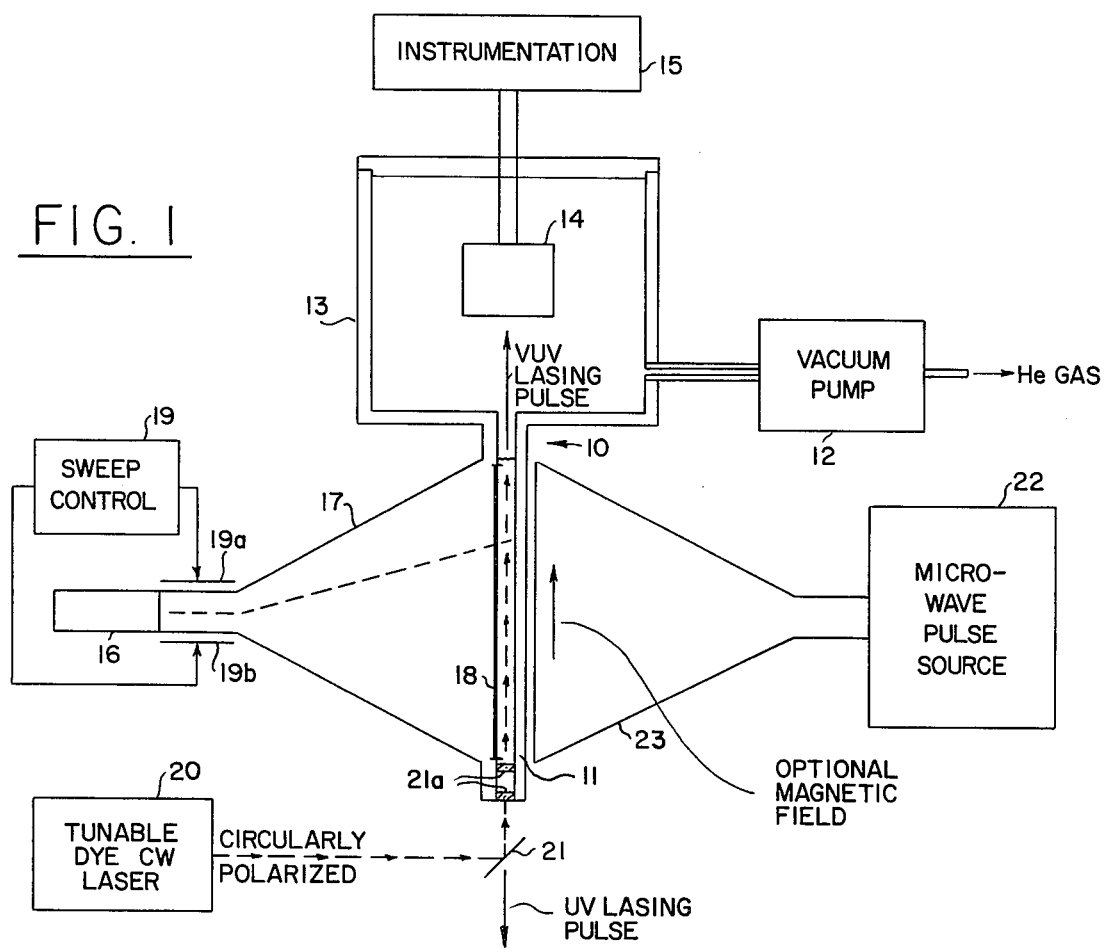
FIG. 1 is a schematic diagram of one embodiment.

Before presenting the theoretical basis for the invention, the method and apparatus will first be described with reference to FIG. 1 which shows schematically a vacuum UV laser system comprising a Dewar 10 having a narrow section 11 filled with superfluid helium, i.e., liquid helium that is maintained at a temperature slightly below its λ point by a vacuum pump 12. The Dewar also has a wide section 13 large enough to receive some experiment 14 which may be connected to some instrumentation 15.

In the first step, an electron gun 16 is used to produce a low-current ($\lesssim$10μA) beam of high-energy (100 to 200keV) electrons directed through a vacuum tube 17 and metal foil 18 into the liquid helium in the Dewar. It should be noted that the metal foil covers a window in the inner wall of the Dewar while the vacuum tube 17 covers a window in the outer wall of the Dewar. The envelope of the vacuum tube 17 thus forms the outer wall of the Dewar over the window while the metal foil effectively forms the face of a cathode-ray tube. The metal foil acts like a wide-mesh screen to the electrons which pass into the helium, and like an impervious membrane to the liquid helium. A sweep-control circuit 19 connected to deflection plates 19a and 19b causes the electron beam to be continually swept up and down the length of the liquid helium column.

Figure 2:
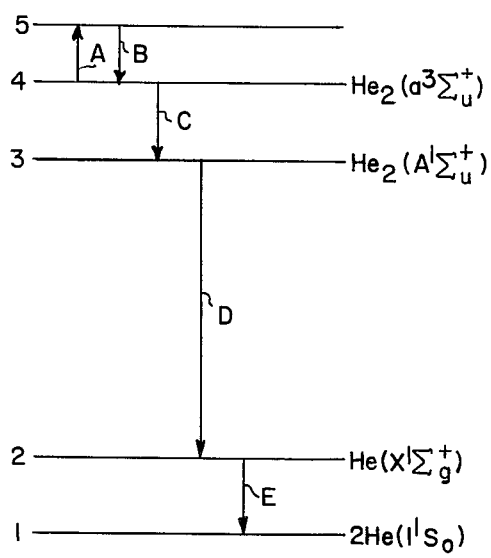
FIG. 2 is an energy level diagram useful in understanding the present invention.

The purpose of the arrangement described thus far is to obtain a high concentration of the metastable He$_2$(a$^3\Sigma_u^+$)=He$_2$* molecules from ground-state helium atoms. FIG. 2 is an energy level diagram (not to scale) showing the metastable level a$^3\Sigma_u^+$. Normally the metastable molecules are quickly destroyed by mutual collisions. As a result, the achievable metastable molecule population by electronic pumping alone is about 10$^{12}$ to 10$^{13}$μm$^{-3}$. That may be sufficient for some UV lasing to take place by transitions from the A$^1\Sigma_u^+$ level to the X$^1\Sigma$g$^+$ level as collision of the He$_2$* molecules destroys them in favor of the A$^1\Sigma_u^+$ level, but a greater population of He$_2$* molecules may provide significantly more laser output.

The He$_2$* molecule population and the feeding rates into the A$^1\Sigma_u^+$ level from the a$^3\Sigma_u^+$ level are expected to be some 10$^6$ and 10$^{12}$ times higher, respectively, by the present invention than those achievable by the simple electron-beam excitation technique just described. The approach is to utilize a double-pumping scheme to achieve the necessary inverted populations. The second pumping to a fifth level is with a low-power (about 100mW) circularly-polarized CW laser 20. A mirror 21 is used to direct the CW laser beam through a suitable window 21a into the column of liquid helium in order to keep the CW laser out of the path of the UV lasing produced in the column. This optical pumping is followed by spontaneous radiative decay and quenching back to the fourth level of spin-aligned $He_2^*$ molecules. Lasing transition of a greater population of $He_2^*$ molecules can then take place to the $X^1\Sigma_g^+$ level.

The theory is that if the metastable molecules $He^*$ are spin-aligned by means of optical pumping, then their mutual destruction by collision is strongly inhibited by the mechanism of spin conservation, and much higher metastable concentrations are achieved. By modeling the various metastable production and destruction processes in the presence of optical pumping, as will be described hereinafter, it has been predicted that the metastable concentrations of order $10^{18} cm^{-3}$ can be achieved with a modestly-powered CW laser, as compared with concentrations of only $10^{13} cm^{-3}$ with just electronic pumping. One optical pumping scheme ($c^3\Sigma_g^+ \leftarrow a^3\Sigma_u^+$) to the fifth level is with the CW laser operating at 0.9096μm. An alternate optical pumping scheme ($e^3\pi_g \leftarrow a^3\Sigma_u^+$) with the laser operating at 0.4650μm might be more convenient in practice than the first scheme because laser wavelengths of about 0.4650μm are more accessible. Still other optical pumping schemes are possible, but these are the two most readily achievable.

Once a high concentration of spin-aligned metastable molecules is achieved (lifetime being about 1ms) the next step is to quickly populate the third (lasing) level, $A^1\Sigma_u^+$, shown in FIG. 2 by applying a strong microwave signal from a source 22 tuned to the Zeeman resonance frequency of the $He_2^*$ molecule. This signal is spread across the entire column of liquid helium by a microwave feed horn 23 and may be applied in the presence of a magnetic field of about 1kG or higher to reduce feeding time into the third level if necessary to achieve desired feed rates. This rapidly equalizes the population of the three magnetic sublevels of the $He_2$ ($a^3\Sigma_u^+$) molecule because it destroys the spin alignment and induces a quick collision destruction of $a^3\Sigma_u^+$ molecules in favor of those in the $A^1\Sigma_u^+$ state. Under these conditions (super-radiant) UV lasing ($A^1\Sigma_u^+ \rightarrow X^1\Sigma_g^+$) occurs. Thus, in the transition of FIG. 2, A is the optical pumping of $He_2^*$ molecules, ($c^3\Sigma_g^+ \leftarrow a^3\Sigma_u^+$) or ($e^3\pi\lambda_g \leftarrow a^3\Sigma_u^+$), B is the spontaneous decay and quenching of the optically pumped $He_2^*$ molecules, C is the transition initiated by a microwave signal from the metastable state $a^3\Sigma_u^+$ to the $A^1\Sigma_u^+$ state, D is the lasing transition to the $X^1\Sigma_g^+$ state; and E is the depopulation of the level $X^1\Sigma_g^+$. Once transition E is complete for a given molecule, the process may be repeated. This may be automatic for a modulated UV lasing action by operating the electronic and the optical pumping continually, and operating the microwave signal source periodically. Following high-energy lasing action induced by the pulsed microwave signal, there may be low-energy lasing action characteristic of electronic pumping for a brief period while the population of spin-stabilized metastable molecules is increased by optical pumping.

A theoretical basis for the invention will now be discussed. The metastability of $He_2^*$ molecules in free space is explained by the fact that electric dipole transitions from triplet-excited states to a singlet ground state are spin-forbidden. The metastable character of these species is apparently not impaired much when they find themselves inside liquid helium. In fact, both absorption and emission spectra of the excited species in liquid helium are remarkably similar to those in free space. The explanation for this is that, as a result of repulsive forces between the excited electron in $He^* = He(2^3S_1)$ or $He_2^*$ and the surrounding helium atoms in the liquid, a cavity or bubble is formed around each excited atom or molecule, so that the latter finds itself in a relatively unperturbed environment. As a result of this, the radiative lifetimes of the metastable $He^*$ and $He_2^*$ are not expected to be dramatically shortened by the presence of the surrounding liquid. Actually there is some experimental evidence in favor of this expectation in that the main destruction mechanism of metastables is not radiative decay but bi-molecular collisions in the case of $He_2^*$, and $He^*$ to $He_2^*$ conversion in the case of $He^*$. The latter mechanism does not cause a loss of electronic excitation but simply implies its transfer from atomic to molecular species. Both mechanisms will be discussed in some detail hereinafter. For the present invention, the important conclusions are that: (i) $He_2^*$ molecules are the longest-lived excited species in liquid helium and (ii) these molecules are predominantly destroyed by mutual deexcitation upon collisions.

It is quite clear that if a way could be found to moderate the effects of $He_2^*$—$He_2^*$ collisions, then one could hope to obtain both longer lifetimes and increased concentrations of $He_2^*$ molecules in liquid helium. Actually, it is known that the bimolecular $He_2^*$ reaction is diffusion-limited, the diffusion coefficient for the $He_2^*$ molecules being determined by $He_2^*$-roton collisions. As rotons are excited at higher temperatures, the destruction rate of $He_2^*$ molecules is observed to decrease. However, this decrease is rather limited (about a factor of 2) over the temperature range explored in these experiments. Consequently, there is little hope to utilize the roton mechanism in trying to achieve higher metastable populations.

A much more promising effect could be the following. If two colliding $He_2^*$ molecules have their spins aligned, i.e., are in the quintet state, then they cannot deexcite to a state of spin 0 to 1, assuming that spin is conserved. There is experimental evidence for spin conservation in $He^*$—$He^*$ collisions in gaseous helium discharges. If spin conservation also holds in $He_2^*$—$He_2^*$ collisions in liquid helium, as there is good reason to believe (spin-orbit forces are known to be small in helium, and $He_2^*$ molecules in bubbles are relatively little perturbed by the liquid environment), then by spin-aligning or polarizing the $He_2^*$ population, one could effectively suppress $He_2^*$ destruction in bimolecular reactions and thereby build up large concentrations of $He_2^*$ molecules. The desired polarization can be achieved by means of optical pumping.

Once the desired population is achieved, a strong microwave signal at the Zeeman resonance frequency is applied to rapidly equalize the populations of the three magnetic sublevels of the $He_2^*$ molecule. As a result of collisions between the different $He_2^*$ molecules thus equalized, rapid deexcitation of the molecules will occur via the reaction $$He_2^* + He_2^* \rightarrow He_4^* \rightarrow He_2(A^1\Sigma_u^+) + 2He$$

Then the transition quickly follows from $He_2(A^1\Sigma_u^+)$ to the molecular ground state $He_2(X^1\Sigma_g^+)$ with the emission of a photon in the vacuum UV spectrum with the spectrum peaked at about $0.0800\mu m$. The molecular ground state is unstable against dissociation into two ground-state helium atoms so that quick depopulation of level 2 to level 1 (FIG. 2) prevents induced absorption and promotes the lasing transition from level 3 to level 2.

Although particular embodiments of the invention have been described and illustrated herein, it is recognized that modifications and equivalents may readily occur to those skilled in the art. For example, low current ($\lesssim 10\mu A$) is used for the laser system of the embodiment disclosed. For high-power lasers, the input current would be scaled up as required. Consequently it is intended that the claims be interpreted to cover such modifications and equivalents.

I claim:

1. A method for achieving large populations of metastable spin-aligned $He_2(a^3\Sigma_u^+)$ molecules in superfluid helium comprising the steps of electronically exciting said helium with an electron beam and optically pumping said helium with a circularly-polarized beam of coherent light from a continuous-wave laser.

2. A method as defined in claim 1 for producing a laser pulse of light in the vacuum ultraviolet wavelength regime from a concentration of spin-aligned metastable $He_2(a^3\Sigma_u^+)$ molecules by radiating said metastable molecules with a microwave signal to destroy spin alignment and induce a quick collision transition of said metastable molecules to $He_2(A^1\Sigma_u^+)$ molecules followed automatically by lasing transition of said $He_2(A^1\Sigma_u^+)$ molecules to $He_2(X^1\Sigma_g^+)$ molecules.

3. A method as defined in claim 2 including the step of providing a magnetic field parallel to the axis of said optical pumping laser beam while said spin-aligned metastable $He_2(a^3\Sigma_u^+)$ molecules are radiated by said microwave signal thereby to facilitate destroying spin alignment of said metastable molecules.

4. A method for achieving a laser pulse in the ultraviolet wavelength regime about 0.0800 $\mu m$ comprising the steps of
establishing a body of superfluid helium,
electrically exciting said body of helium with an electron beam thereby to produce $He_2(a^3\Sigma_u^+)$ molecules from ground state helium atoms,
spin aligning said $He_2(a^3\Sigma_u^+)$ molecules by optical pumping with a circularly-polarized continuous-wave laser, and
radiating said spin-aligned $He_2(a^3\Sigma_u^+)$ molecules with microwave energy to destroy spin alignment, thereby to induce a quick collisional transition of said $He_2(a^3\Sigma_u^+)$ molecules to $He_2(A^1\Sigma_u^+)$ molecules that spontaneously undergo a lasing transition to $He_2(X^1\Sigma g^+)$ molecules.

5. A method as defined in claim 4 wherein spin alignment is achieved by optical pumping with said circularly-polarized continuous-wave laser operating at about $0.9096\mu m$ wavelength.

6. A method as defined in claim 4 wherein spin alignment is achieved by optical pumping $(e^3\pi g \leftarrow a^3\Sigma_u^+)$ with said circularly-polarized continuous-wave laser operating at about $0.4650\mu m$ wavelength.

7. A system for generating a pulse of coherent radiation in the ultraviolet wavelength regime about $0.0800\mu m$, comprising
a Dewar containing a body of superfluid helium,
means for electrically exciting said body of helium with an electron beam thereby to produce $He_2(a^3\Sigma_u^+)$ molecules from ground state helium atoms,
means for optically pumping said $He_2(a^3\Sigma_u^+)$ molecules with a continuous wave of circularly-polarized coherent radiation thereby to spin align said $He_2(a^3\Sigma_u^+)$ molecules, and
means for radiating said spin-aligned $He_2(a^3\Sigma_u^+)$ molecules with microwave energy to destroy spin alignment, thereby to induce a quick collisional transition of said $He_2(a^3\Sigma_u^+)$ molecules to $He_2(A^1\Sigma_u)$ molecules that spontaneously undergo a lasing transition to $He_2(X^1\Sigma g^+)$ molecules.

8. A system as defined in claim 7 wherein said circularly-polarized coherent radiation is at a wavelength about $0.9096\mu m$.

9. A system as defined in claim 7 wherein said circularly-polarized coherent radiation is at a wavelength about $0.4650\mu m$.

10. A system as defined in claim 7 wherein said means for electrically exciting said body of helium is comprised of an electron gun generating a beam of electrons into vacuum space between the outer wall and the inner wall of said Dewar in a direction passing through a window in said inner wall and through said helium, said window being covered with a metal foil to contain said superfluid helium and pass said electrons.

11. A system as defined in claim 10 wherein said Dewar has a length in a direction across said window greater than a width in the direction of said electron beam through said window and helium, and said means for electrically exciting said body of helium includes means for continually sweeping said beam across said window the full length thereof for maximum direct bombardment of said helium to said electron beam.

12. A system as defined in claim 11 wherein said means for optical pumping with circularly-polarized coherent radiation is comprised of means for directing a beam of coherent radiation through said body of helium in a directional parallel to said window for exposure of a maximum volume of helium to said beam of coherent radiation.

13. A system as defined in claim 12 wherein said microwave energy radiation means comprises a microwave feedhorn for spreading microwave energy radiation across the full length of said Dewar for maximum direct radiation of said helium.

14. A system as defined in claim 13 including a magnetic field parallel to the axis of said coherent radiation beam while said helium is radiated with said microwave energy thereby to facilitate destroying spin alignment of said $He_2(a^3\Sigma_u^+)$ molecules.

* * * * *